United States Patent
Musgrove et al.

(10) Patent No.: US 7,246,110 B1
(45) Date of Patent: Jul. 17, 2007

(54) PRODUCT FEATURE AND RELATION COMPARISON SYSTEM

(75) Inventors: Timothy A. Musgrove, Morgan Hill, CA (US); Robin Walsh, San Francisco, CA (US)

(73) Assignee: CNET Networks, Inc., San Francisco, CA (US)

( * ) Notice: Subject to any disclaimer, the term of this patent is extended or adjusted under 35 U.S.C. 154(b) by 0 days.

(21) Appl. No.: 09/579,859

(22) Filed: May 25, 2000

(51) Int. Cl.
*G06F 17/00* (2006.01)
(52) U.S. Cl. .............................. 707/3; 707/10; 705/28
(58) Field of Classification Search ................ 705/27, 705/7–10, 28; 707/3, 5, 7, 10, 100
See application file for complete search history.

(56) References Cited

U.S. PATENT DOCUMENTS

| | | | | |
|---|---|---|---|---|
| 4,881,178 A * | 11/1989 | Holland et al. | ................ | 706/12 |
| 5,167,011 A * | 11/1992 | Priest | ........................... | 706/62 |
| 5,182,793 A * | 1/1993 | Alexander et al. | ............ | 706/13 |
| 5,367,627 A | 11/1994 | Johnson | | |
| 5,550,746 A * | 8/1996 | Jacobs | ........................ | 700/231 |
| 5,592,375 A * | 1/1997 | Salmon et al. | .................. | 705/7 |
| 5,615,342 A | 3/1997 | Johnson | | |
| 5,875,110 A * | 2/1999 | Jacobs | ........................ | 700/232 |
| 5,909,669 A * | 6/1999 | Havens | ........................ | 705/11 |
| 5,963,939 A * | 10/1999 | McCann et al. | ................ | 707/4 |
| 6,078,897 A * | 6/2000 | Rubin et al. | ................... | 705/14 |
| 6,119,114 A * | 9/2000 | Smadja | ........................... | 707/7 |
| 6,143,827 A * | 11/2000 | Morizono et al. | ........... | 525/192 |
| 6,236,990 B1 * | 5/2001 | Geller et al. | .................... | 707/5 |
| 6,266,649 B1 * | 7/2001 | Linden et al. | ................. | 705/26 |
| 6,282,509 B1 * | 8/2001 | Miyauchi | ...................... | 704/10 |
| 6,333,852 B1 * | 12/2001 | Lin | ........................... | 361/697 |
| 6,360,139 B1 * | 3/2002 | Jacobs | ........................ | 700/232 |
| 6,594,598 B1 * | 7/2003 | Ishizuka et al. | .............. | 702/84 |
| 6,600,497 B1 * | 7/2003 | Gottfurcht et al. | .......... | 345/735 |
| 6,622,128 B1 * | 9/2003 | Bedell et al. | .................. | 705/30 |
| 6,785,671 B1 * | 8/2004 | Bailey et al. | ................... | 707/3 |
| 6,826,552 B1 * | 11/2004 | Grosser et al. | ............... | 706/47 |
| 7,047,242 B1 * | 5/2006 | Ponte | ........................... | 707/10 |
| 7,082,426 B2 * | 7/2006 | Musgrove et al. | ............. | 707/3 |
| 7,133,862 B2 * | 11/2006 | Hubert et al. | ................... | 707/3 |
| 2001/0044837 A1 * | 11/2001 | Talib et al. | ................. | 709/219 |

OTHER PUBLICATIONS

Roselius, Ted, in "Consumer Rankings of Risk Reduction Methods," Journal of Marketing, vol. 35, pp. 56-61, Jan. 1971.*
Ragnaswamy et al., in "Software tools for new product development," JMR, Journal of Marketing Research, 9 pages, Feb. 1997.*

* cited by examiner

*Primary Examiner*—Andrew Joseph Rudy
(74) *Attorney, Agent, or Firm*—Marc S. Kaufman; Daniel S. Song; Nixon Peabody, LLP (57) ABSTRACT

A method of presenting data regarding products. Feature categories are assigned to each product category based on available data. A weighted importance is assigned to each feature category of each product category based on the available data. The items in the product category are ranked according to the weighted importance of the feature categories of each item, and the evaluation metrics of each feature category.

28 Claims, 6 Drawing Sheets

PRODUCT FEATURE AND RELATION COMPARISON SYSTEM

FIELD OF THE INVENTION

The present invention relates generally to the field of e-commerce and, more specifically, to knowledge representation and decision support regarding multiple items for users of a network-based transaction facility such as, for example, an Internet-based comparison shopping facility.

BACKGROUND OF THE INVENTION

An advantage offered by network-based transaction facilities (e.g., business-to-business, business-to-consumer and consumer-to-consumer Internet marketplaces and retailers) and on-line communities is that by using such facilities or communities, users may shop from a variety of merchants.

The merchants may offer a variety of products or specialize in one type of product. Some users buy products after searching through the offerings of the various merchants and comparing the products and the prices.

Recently comparison shopping facilities have developed that list various merchant offerings on one site to aid users in choosing from which merchant they should buy an item. These comparison shopping facilities present items by listing the price and name of the merchant offering the item.

The user may choose items from the listing and go to each merchant's site to learn more about each item or buy the item. Each available item from each manufacturer is listed separately. Thus, a user has to go to the comparison shopping facility either knowing what product to buy beforehand, and compare merchants and prices at the facility, or look at each item separately, by following a link to each merchant's site, to determine if the item is appropriate. Most comparisons performed by comparison shopping sites are based on the merchant's offer price. That is, the result of the comparison shopping is a list of items listed according to price.

SUMMARY OF THE INVENTION

A method of presenting data regarding products is described. In one embodiment, feature categories are assigned to each product category based on available data. A weighted importance is assigned to each feature category of each product category based on the available data. The items in the product category are ranked according to the weighted importance of the feature categories of each item.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A product feature and relation comparison system is disclosed. In the following description, numerous specific details are set forth such as configurations, media, etc., in order to provide a thorough understanding of the present invention. It will be apparent, however, to one skilled in the art that these specific details need not be employed to practice the present invention. In other instances, well known media or methods have not been described in detail in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1:
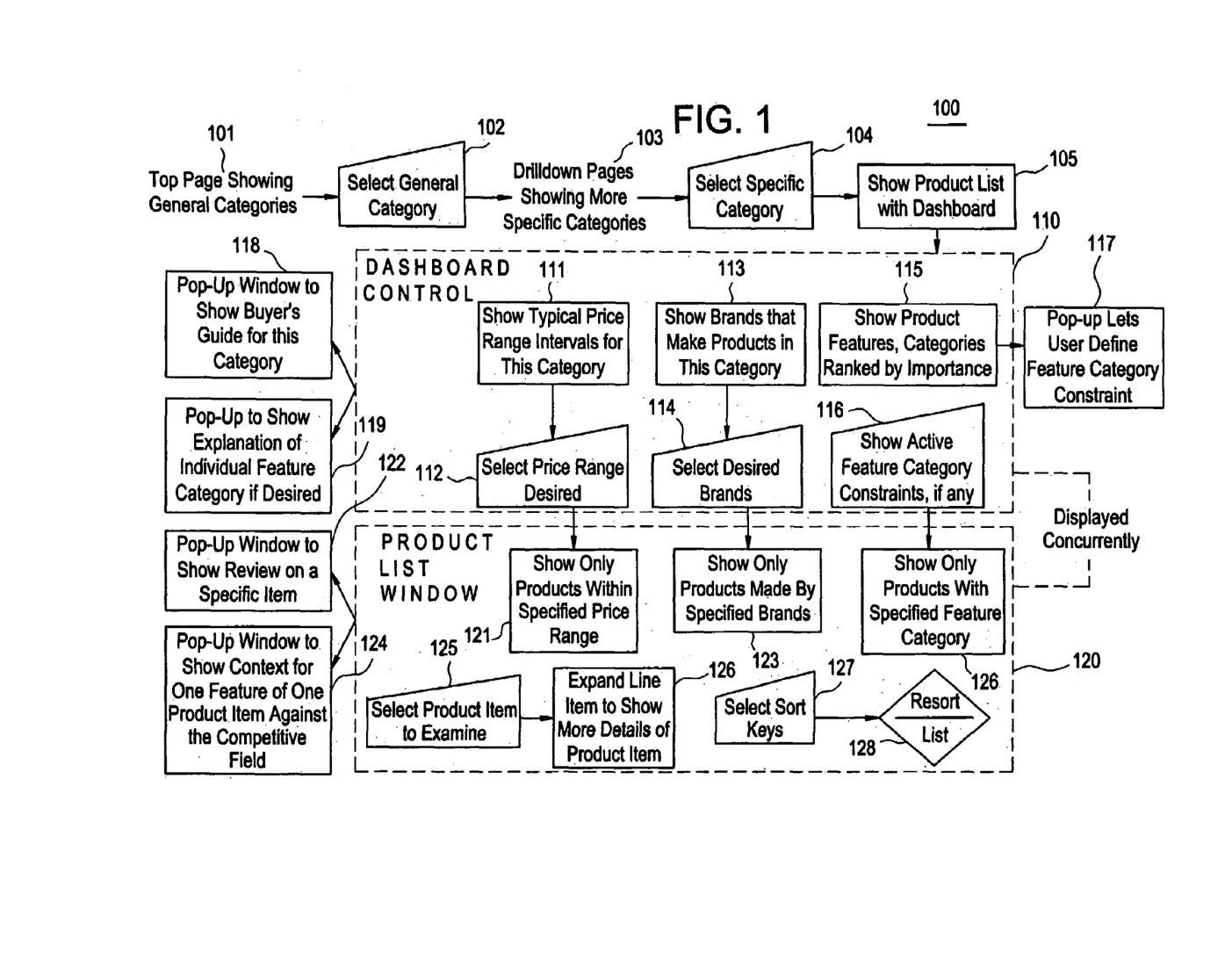
FIG. 1 illustrates an embodiment of a product feature and relation comparison system.

FIG. 1 illustrates an embodiment of a product feature and relation comparison system. The process may be performed by processing logic that may comprise hardware, software, or a combination of both. Note that although the process is described with reference to comparing features of products, it should be understood that the feature comparison methodology described herein may be applied to other types of services.

Referring to FIG. 1, a product feature and relation comparison system 100 is illustrated. Using a computer, a user able to view screens that transitions him through the comparison shopping process. Each of the displays represents a page that is displayed in response to some user action. When a user makes a selection or enters information on a page, a request is made to a server over a network to obtain another page. The request may cause the comparison shopping system to perform one or more functions at or under control of the server, with results being provided to user in the form of one or more web pages.

Initially, a user, using a computer, which may be coupled to a network or stand alone, displays a first screen, or top page, 101 showing general categories for selection. The network may be a wide area network such as, for example, the Internet, or a proprietary network such as America Online®, CompuServe®, Microsoft Network®, or Prodigy®.

At processing block 102, a user selects a general category. Optionally, the computer then displays drilldown pages 103 showing more specific categories. At processing block 104, the user selects a specific category. In response to selection of the specific category, the computer shows a product list window 120 with a dashboard control 110 at processing block 105. The user may have to select a certain number of specific categories at processing block 103 before the computer displays the product list window 120.

The dashboard control 110 may be used to filter the product list 120 by allowing the user to choose price, brand and features the user wants to see and/or believes to be important. In processing block 111, the screen shows typical price range intervals for the product category chosen. At processing block 112, the user may select one of the price range intervals shown. In response to the price range selected by a user, the system 100 then filters the product list at processing block 121 to show at window 120 only products within the specified price range.

At processing block 113, the screen shows brands that make products in the product category chosen. At processing block 114, the user may select one or more of the brands shown on dashboard control 110. In response to a brand selection, the system 100 filters the product list at processing block 123 to show window 120, it only products made by the specified brands.

At processing block 115 of the dashboard control 110, the system shows product feature categories ranked by importance. At processing block 117, which may comprise a pop-up window, the system allows the user to define feature category constraints. In other words, the user is able to specify those product features that are important to him. In response to selection of these specific product features, the dashboard control 110 shows active feature category constraints at processing block 116, if any. At processing block 126, the system 100 filters the product list to show in the product list window 120 only products with the specified feature categories.

The dashboard control 110 may also include pop-up windows 118 and 119. Pop-up window 118 shows a user buyer's guides for the product category chosen. Pop-up window 119 may show a user explanations of individual feature categories if the user wishes to see such explanations.

The product list window 120 may also include pop-up windows 122 and 124. Pop-up window 122 may show a review on a specific item in the product list window 120, while pop-up window 124 may show the context for one feature of one item in the product list window against the competitive field, or other products in the product category chosen. The feature contextualization described with reference to pop-up window 124 will be discussed further below, with respect to FIG. 5.

At processing block 125, from the product list window, a user may select a specific product item to examine. In response to a selection, the system 100 expands the line item to show more details of the selected product item in processing block 126. The product list window may also be reorganized by selecting sort keys to re-sort the list. At processing block 127, a user may select sort keys such as, for example, price, memory size, or any other product features(s) that the user chooses. In response to the selection, at processing block 128, the system 100 re-sorts the list according to the users chosen sort method.

Figure 2A:
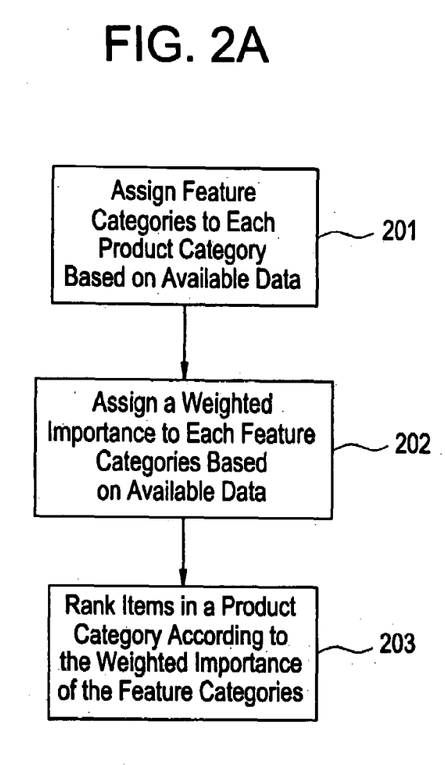
FIG. 2a is a flow diagram of an embodiment of a product feature and relation comparison system.

FIG. 2a is a flow diagram of an embodiment of a product feature in relation comparison system. At processing block 201, the system 100 assigns feature categories to each product category based on available data. Available data may include, for example, features that are important to a product or that occur in all brands of the same product extracted from literature about the product such as articles, reviews, etc.

At processing block 202, a system 100 assigns weighted importance to each feature category based on the available data. The available data may include, for example, the number of times the feature is mentioned in product literature. The weighted importance may include assigning a numerical value between 0 and 100, for example. Alternatively, the weighted importance may include a different numerical scale or assigning a letter value to each feature category within a product category, or any other way of signifying a weighted importance.

The feature categories and weighted importance of each feature category are stored in a database (not shown) for each product category. It will be understood that the processes performed in processing blocks 201 and 202, and similar processes described below, may be edited by an editor. Such editing may, for example, ensure that the representation of the data in the database is correct (e.g., that a product category includes all of the correct feature categories with those categories weighted correctly).

At processing block 203, the items in the product category are ranked according to the weighted importance of the feature categories. Thus, for a category such as, for example, personal digital assistant (PDA), the feature categories may include screen type, memory, upgradability, and functions, etc. If the available data indicates that the screen type and memory are more important for PDA's than upgradability or a number of functions, then screen type and memory will be given higher ratings than upgradability and functions available. Thus, PDA's may be ranked according to the average price first, then screen type, then memory, etc. In one embodiment, the ranking is stored in the database. In an alternate embodiment, the ranking is dynamically generated every time a person chooses a product category.

Figure 2B:
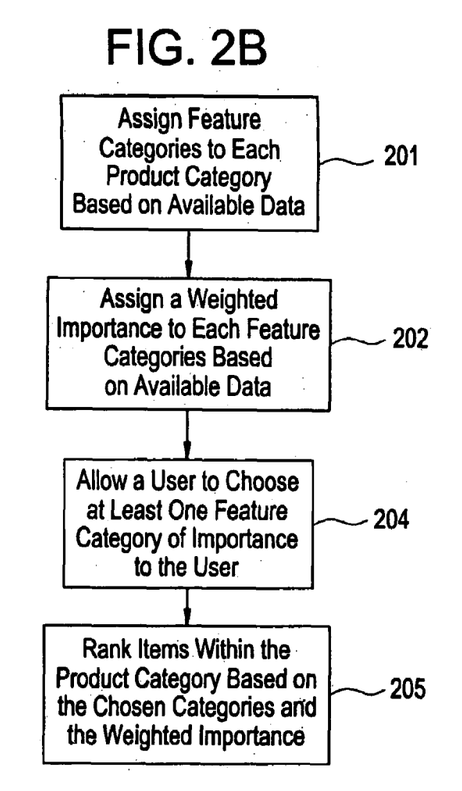
FIG. 2b is a flow diagram of another embodiment of a product feature and relation comparison system.

FIG. 2b shows a flow diagram of another embodiment of a product feature in relation comparison system. At processing block 201, the system 100 assigns feature categories to each product category based on available data. At processing block 202, the system assigns a weighted importance to each feature category based on available data. At processing block 204, the system allows the user to choose at least one feature category of importance to the user. For example, when the product category is PDAs, the user may choose the feature category corresponding to the number of functions included.

In response to the user selection, at processing block 205, the system ranks the items within the product category based on the chosen categories and the weighted importance. In the example above, where the category is PDAs, the system re-sorts the items within the product category to give more importance to the feature category of number of functions.

Figure 3:
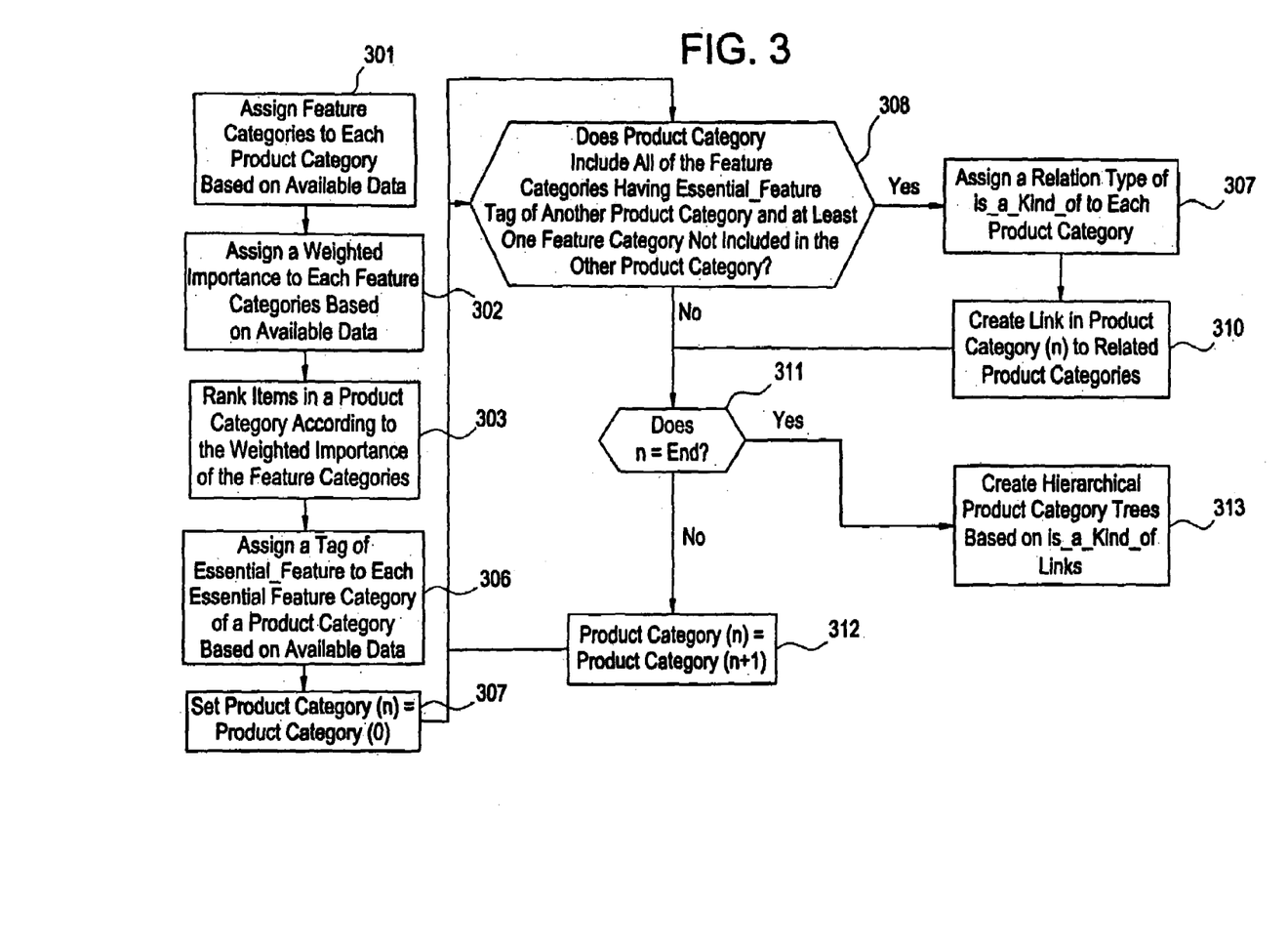
FIG. 3 is a flow diagram of another embodiment of a product feature and relation comparison system.

FIG. 3 is the flow diagram of an embodiment of a product feature and relation comparison system. At processing block 301, the system 100 assigns feature categories to each product category based on available data. At processing block 302, the system 100 assigns a weighted importance to each feature category based on available data. At processing block 303, the system 100 ranks items in a product category according to the weighted importance of the feature categories. At processing block 306, the system 100 assigns an essential_feature tag to each essential feature category of a product category based on available data. Thus, for PDAs, for example the essential feature categories may include screen resolution and memory. All or any of the processes performed by processing blocks 301-303 and 306 may be edited by an editor to override automated assignments made by the system 100 based on available data.

In the embodiment illustrated in FIG. 3, the system 100 creates links within product categories to relate each product category to another product category where a relationship exists between the product categories. Many different processes may be used to relate the product categories to one another.

In one embodiment, at processing block 307, the product category counter is set to 0 so that product_category (n)=product_category (0). At processing block 308, system 100 looks at product_category (n) to determine whether product_category (n) has all of the essential_feature categories of at least one other product category plus at least one other feature category that is not included in the other product category.

If all the essential_feature categories plus one other feature category is included in product_category (n), a relation type of is_a_kind_of is assigned to product_category (n) at processing block 309. A relation type of is_a_kind_of represents that the product category is a subset of another product category. For example, Organizers & Notetakers is a subset of PDAs and PDAs are a subset of electronics. Thus, the category Organizers & Notetakers would be assigned a relation type of is_a_kind_of PDA and the category PDA would be assigned a relation type of is_a_kind_of Electronics.

At processing block 310, a link is created between product_category (n) and each related product category. Then, at processing block 311, n is compared to End to see if the product category just examined was the last product category in the database. If n equals the value of End, in block 311, the product category was the last product category.

If the product category is the last product category, then the system 100 creates hierarchical product category trees based on is_a_kind_of links, at processing block 313. At processing block 312, if the product_category (n) is not the last product category, product_category (n) is incremented by one and the next product category is examined at processing block 308.

When the links have been created, when a user chooses to look at the category Electronics, a is_a_kind_of link between Electronics and other categories will prompt the system 100 to show the user a screen showing different branches of the Electronics category. Thus, in the example above, the user will see a screen that includes PDAs as a subcategory of Electronics. If the user chooses PDAs, the user will see a screen that includes Organizers & Notetakers as a subcategory of PDAs.

Relation types other than "is_a_kind_of" may be assigned to product categories. Other relation types include "is_a_part_of," "is_an_accessory_for," and "is_a_resource_for." A relation type of is_a_part_of may be assigned to a product category if the items in the product category are used only by inclusion in items of a second product category. For example, with respect to PDAs, this may include replacement memory chips, replacement screens, etc.

A relation type of is_an_accessory_for may be assigned to a first product category if the items in the product category are used only in conjunction with a second product category although the items in the second product category may be used without the items in the first product category. An example of this is Palm for the Palm V PDA with the external keyboard for Palm V being in the second product category.

A relation type of is_a_resource_for may be assigned to a product category if the items in the product category are used only in conjunction with items in a second product category and is something that is consumable or exhaustible or has a fixed-limit life-span. The product categories that are assigned a relation type of is_a_resource_for may or may not be necessary for the base product. For example, printer cartridges are a resource for printers.

Links may be created within each product category to reflect each assigned relation type. Thus, when a product list is displayed on product list window 120, a link may be included in the display to reflect that other items related to the items listed are available. Thus, the product list window 120 may include links indicating that "parts for", "accessories for", or "resources for" the items displayed in the product list window 120 are available. The links may be used to go directly to the product list window 120 of the related product category.

Figure 4:
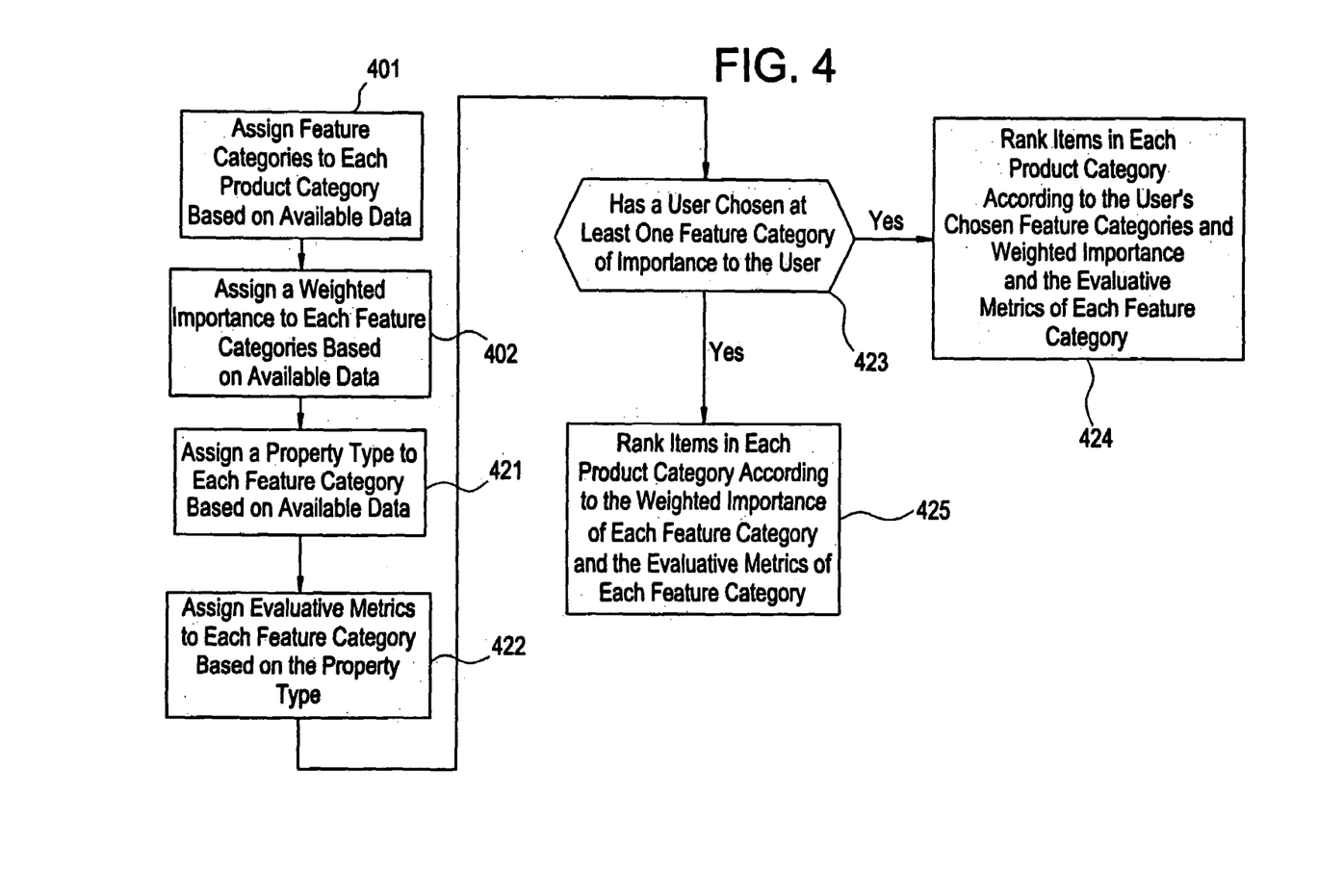
FIG. 4 is a more detailed flow diagram of the product feature and relation comparison system of FIG. 2b.

FIG. 4 is a flow diagram of an embodiment of a product feature and relation comparison system. At processing block 401, a system 100 assigns feature categories to each product category based on available data. At processing block 402, the system assigns a weighted importance to each feature category based on available data. At processing block 412, the system 100 assigns a property type to each feature category based on the available data. The property type for each feature category is then stored in a database (not shown). The property types may include numerical property types, enumerated property types, text property types and meta property types.

In one embodiment, numerical property types represent properties that are measured in a quantitative way. For example, numerical property types may include two sub-types: integer and decimal. Integer values are represented as −3, −2, −1, 0, 1, 2, 3, etc. Decimal properties are represented as real numbers such as, for example, 36.1 or 0.125, etc. For example, on a VCR, the number of audio input jacks is an integer value, e.g., 4, while the width is in inches represented as a decimal number, e.g., 19.75".

Enumerated property types are property types that have a fixed number of specified values. There are four sub-types of enumerated property types, including discrete, scalar, Boolean property types, and qualified Boolean property types. Discrete properties are values that do not admit of any evaluative scale, such as red, blue, yellow, etc., for example, where none of these values is inherently more valuable to a user than another. For example, the colors of a GameBoy Device (e.g., yellow, blue, etc.) are enumerated property types.

Scalar values are enumerated values that do admit of an ordered scale, such as, for example, black-and-white, grayscale, color, etc., where each value in the list does have an inherently greater or lesser value than each other value in the list. Boolean properties have a simple yes/no or a true/false valuation. Qualified Boolean properties have a yes/no/optional enumeration indicating either that the property exists (yes), it does not exist (no), or that it is an optional add-on to the product (optional). For example, some cameras have flash capability, some no flash capability, some can add a flash capability.

Text properties are those properties that are represented by free form text. Text properties may or may not admit of a value. For example, an item having no text in a feature category may be of lesser value than an item having text in the same category. For example, football jerseys may have an "autographed by" field which would be represented in free form text.

Meta properties are families of either Boolean or qualified Boolean properties that are grouped under a common label of which they are all instances. In the product category of television sets, for example, a Meta property grouping may be "special display functions." A "special display functions" grouping may include, for example, picture-in-picture, closed caption, Spanish language menus, etc. In this example, "special display functions" is a meta property that groups together numerous Boolean properties (the television has it or it does not have it).

All of the assignments of property type to feature categories may be reviewable and overrideable by editors.

At processing block 422, evaluative metrics are assigned to each feature category based on the property type. Thus, any property type that may be compared may be assigned evaluative metrics describing how the properties or features in a feature category should be compared to distinguish between items in a property category.

For example, if the property type is a numerical property type, then the features in each feature category are compared with respect to the numerical value for each item. Numerical properties may also be given a tag of "forward" or "backward" or "non-applicable" to indicate what numerical order is preferable from a user's point of view. If a larger number is more preferable from a user's point of view, a forward metric should be assigned; if a smaller number is preferable from a user's point of view, a backward metric should be assigned; or if a numerical property does not inherently indicate a preference from a user's point of view, a non-applicable metric may be assigned. A non-applicable metric may be applied to a piece of furniture such as a chair, for example, where the height of the chair does not matter. The property types and evaluative metrics are assigned based on available data. In one embodiment, the enumerated and Boolean types also have metrics.

All of the assignments of evaluative metrics and forward/backward/non-applicable metrics may be overridden by editors.

At processing block 423, the system checks to see if a user has chosen at least one feature category of importance to the user. If the user has chosen a category of importance to the user, the system 100 ranks each product category according to the user's chosen feature categories, the weighted importance of each feature category and the evaluative metric of each feature category. Thus, items ranked in product list window 120 would rank items giving priority to the user's chosen feature categories using the evaluative metric to order the items. Although the user chosen feature categories are given priority, the weighted importance of each feature category is also used in the ranking. In one embodiment, an algorithm to perform the ranking involves diverse factors including what this user has selected, what other users most frequently select, what is more frequently and prominently mentioned in product literature and reviews as measured statistically.

If the user has not chosen at least one feature category of importance to the user at processing block 423, the system 100 proceeds to processing block 425. At processing block 425, the system 100 ranks the items in each product category according to the weighted importance of each feature category and the evaluated metrics of each feature category of the product category.

Figure 5:
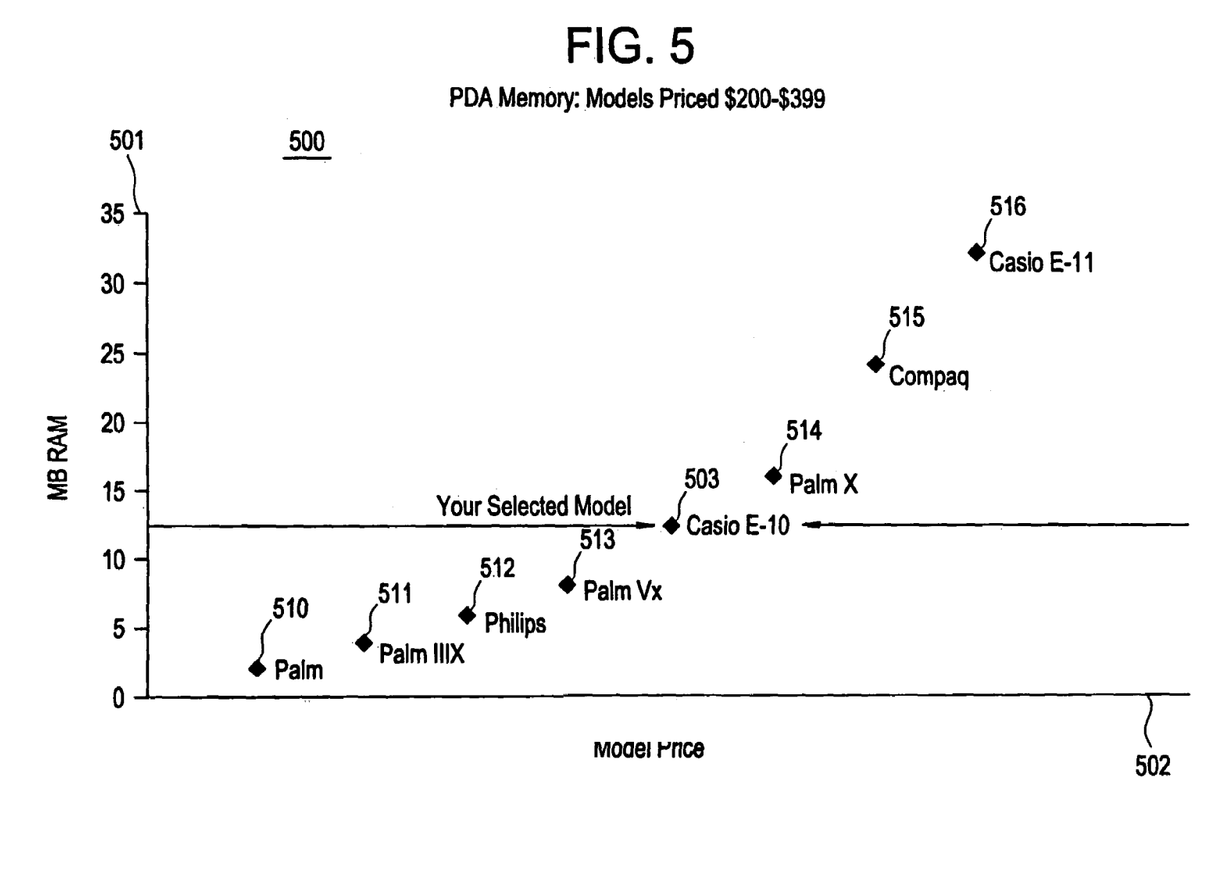
FIG. 5 is a graph illustrating an embodiment of a feature contextualization system.

FIG. 5 is a graph illustrating an embodiment of a feature contextualization system. Graph 500 is an example of the contents of a pop-up window 124 showing the context for one feature of one product against the competitive field. As an example, FIG. 5 shows a feature contextualization image 500 illustrating the placement of a selected model of a PDA based on the memory of the PDA in the price range chosen by the user. The graph 500 shows random access memory (RAM) 501 in megabytes on the y axis. The graph 500 shows the model price along x access 502.

The selected model 503 is compared to other models 510-516 which are priced in the price range of $200-$399. Thus, a user may see where the chosen model 503 stands with regard to the amount of memory available in the user's chosen price range of a field of products. This context sensitive presentation is possible because of the inclusion of the evaluative metrics and delineation of the property values throughout an entire category. Any feature category may be used to show the chosen product item against the competitive field.

Figure 6:
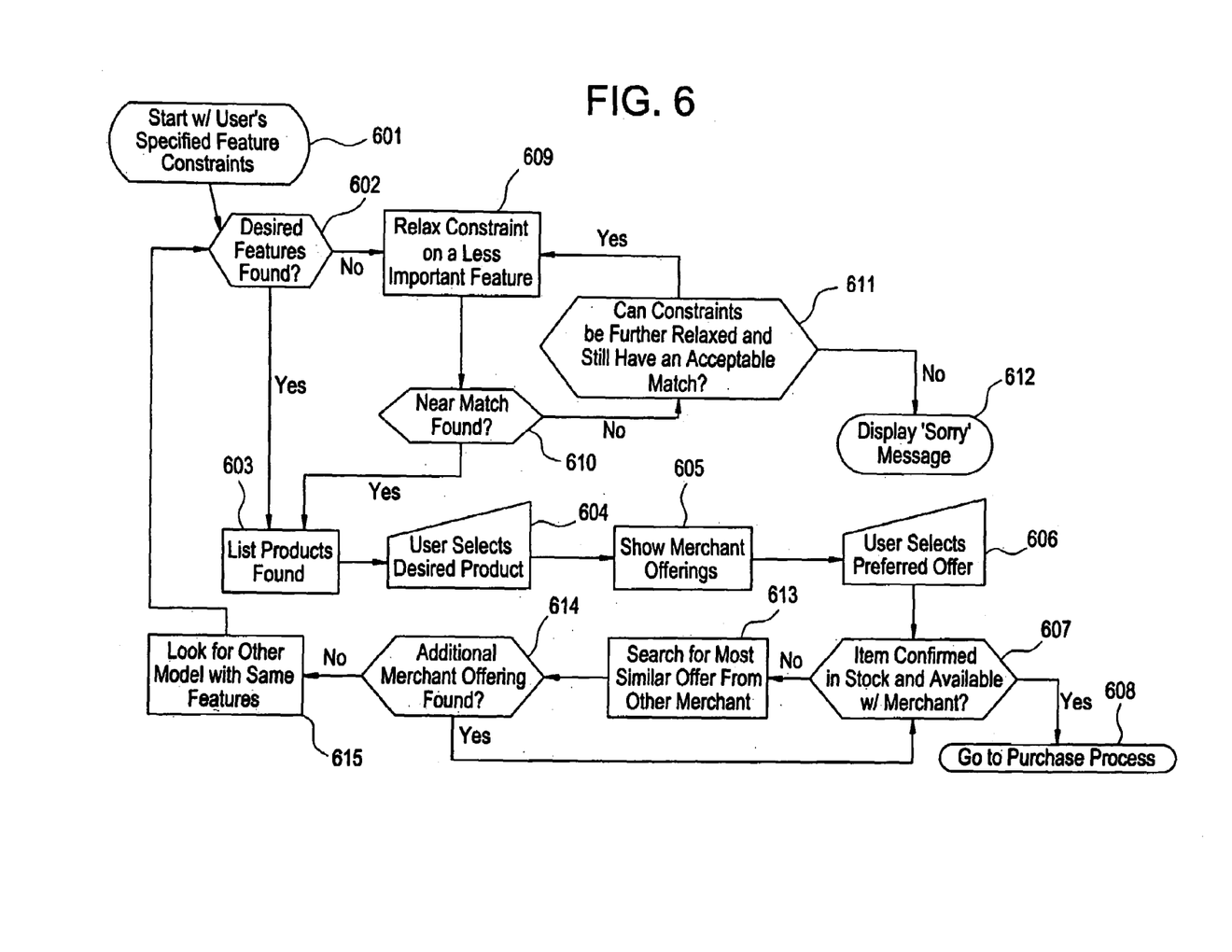
FIG. 6 is a flow diagram of an embodiment of a decision support system.

FIG. 6 is a flow diagram of an embodiment of a decision support system. At processing block 601, the system starts with user specified feature constraints. At processing block 602, the feature searches through a database to see if the desired features are found. If the desired features are found, the product items are listed at processing block 603. At processing block 604, the user selects the desired product. At processing block 605, the system 100 shows merchant offers for the selected product item. At processing block 606 the user selects the preferred offer.

The merchant offers shown at processing block 605 may include buyer information data retrieved from available data. The buyer information data may also be organized into buyer information categories. The buyer information categories may include the price offered by the merchant, the shipping costs, the shipping method and availability of the item. The user may also choose the type of shipping method to determine the shipping costs and the amount of time needed for shipping.

Each of the buyer information categories may also be ranked according to available data to show the merchant offers in a list. The ranking of the merchant offers may be based on weighted importance and evaluative metrics assigned to the buying information categories based on available data, as described with respect to the feature categories above.

At processing block 607, the system 100 confirms that the item is in stock and available with the merchant chosen. If the item is confirmed to be in stock and available, the system 100 proceeds to the purchase process at processing block 608.

If the item is not available with the chosen merchant or is not in stock, the system will search for the most similar offer from other merchants at processing block 613. If additional merchant offers are found, at processing block 614, the system 100 returns to processing block 607 to confirm whether the item is in stock and available. If the additional merchant offers are not found at processing block 615, the system looks for other models with the same features and proceeds to processing block 602 to determine whether the desired features are in the database.

If at processing block 602, the desired features are not found, then at processing block 609, the constraints on the less important features are relaxed. At processing block 610, the system 100 determines if a near match is found. If a near match is found, the system proceeds to processing block 603 and lists the products found. If a near match is not found, then the system determines whether the constraints can be further relaxed and still have an acceptable match at processing block 611. For example, if a User wants a Sony TV 27" w/PIP price $369 and it is not available, one embodiment of the system may provide the following list of products that match the relaxed constraints.

|  | | |
|---|---|---|
| | 1. Sony TV 27" w/PIP price $379 | 96% value match |
| | 2. Philips TV 27" w/PIP price $369 | 91% value match |
| Threshold 82% | 3. Sony TV 25" w/PIP price $339 | 84% value match |
| | 4. Sony TV 27" No PIP price $365 | 80% value match |
| | 5. Sony TV 26" No PIP price $371 | 74% value match |

In one embodiment, the percentage value match is effected by direct features weighted differently as regards to how strongly the disparity will effect this number. Those above the threshold may be shown.

If the constraints can be further relaxed, then the system 100 proceeds to processing block 609 to further relax the constraints on less important features. If the constraints cannot be further relaxed, the system displays a "sorry" message at processing block 612. The system may ask the user to specify other feature category constraints after displaying the "sorry" message at processing block 612.

It will be appreciated that all of the components described are not necessary for this invention, and components may be added or deleted depending on the system requests. It will also be appreciated that all of the above processes for classifying or weighting or evaluating data that is performed by automated means, such as software or hardware, may be overridden by editors.

Whereas many alterations and modifications of the present invention will no doubt become apparent to a person of ordinary skill in the art after having read the foregoing description, it is to be understood that the various embodiments shown and described by way of illustration are in no way intended to be considered limiting. Therefore, references to details of various embodiments are not intended to limit the scope of the claims which in themselves recite only those features regarded as essential to the invention.

We claim:

1. A method of ranking products of a plurality of different brands based upon data records stored in at least one computer readable storage medium and including data indicating product features and values corresponding to the product features, said method comprising:

assigning a plurality of feature categories corresponding to a plurality of product features for at least one product category based on available data in the data records;

assigning a weighted importance to the plurality of feature categories based on available data in the data records;

assigning evaluative metrics to each feature in each feature category;

ranking products of the plurality of different brands in the product category according to the weighted importance of the feature categories included in each item and based on each product's evaluative metrics;

receiving a plurality of selections from a user indicating a plurality of feature categories of importance to the user for the product category;

assigning an increased weighted importance of the selected feature categories;

generating a customized ranking of products in the product category ranked based on the weighted importance of each feature categories, the increased weighted importance of the selected feature categories, and each product's evaluative metrics;

providing to the user, the generated customized ranking of products in the product category;

assigning a tag to each essential feature category of each product category based on available data;

determining whether each product category includes all of the feature categories having the tag of another product category, and includes at least one feature category that the other product category does not have;

assigning a relation type of kind to at least one product category based on said determination;

labeling the at least one product category as a child category of the other product category; and labeling the other product category as a parent category of the child product category.

2. The method of claim 1 wherein assigning a weighted importance to each feature category comprises assigning a score between 0 and 100 to each feature category in a product category.

3. The method of claim 1 wherein the products in each product category are products offered for sale on the internet.

4. The method of claim 1 further comprising:

creating links within each product category to reflect the assigned relation; and using the assigned relation to create at least one hierarchical product category tree wherein each hierarchical category tree has a heading product category that is only a parent category and changing the assigned weighted importance of a feature in the parent category changes the assigned weighted importance of the feature in the child category.

5. The method of claim 4 wherein the assigned weighted importance of a feature in a child category overrides weighted importance assigned to the feature in the child category's parent category.

6. The method of claim 1 further comprising:
assigning a property type to each feature category;
wherein said step of assigning the evaluative metrics to each feature in each feature category is based on the feature category property type and available data unless the property type is a discrete property type.

7. The method of claim 1 wherein the products in each product category are products offered for sale by merchants.

8. The method of claim 6 wherein assigning the property type comprises:
assigning a numerical property type to a feature category if the features in the feature category are measured in a quantitative way;
assigning an enumerated property type to a feature category if the features in the feature category have a fixed number of specified values including
assigning a sub-property type of discrete if one feature in a feature category is not inherently more valuable than another,
assigning a sub-property type of scalar if one feature in a feature category is inherently more valuable than another
assigning a sub-property type of Boolean if the features in a feature category may have a valuation of only yes or no;
assigning a sub-property type of qualified Boolean if the feature in a feature category may have a valuation of yes, no, or optional; and
assigning a property type of text property if the features in the feature category are represented by free form text.

9. The method of claim 6 further comprising:
assigning a special meta-tag to a cluster of feature categories based on groupings derived from the data records if the features of the categories may have a value consisting of one of: yes, no or optional.

10. The method of claim 9 further comprising:
ranking items within a product category by the number of feature categories represented in an item within a cluster of feature categories.

11. The method of claim 6 further comprising:
assigning a evaluative tag of forward metric to a feature category if a value of an item in a product category increases as a numerical valuation of features within the feature category increases based on available data;
assigning a evaluative tag of backward metric based on available data to a feature category if the value of an item in a product category decreases as numerical valuation of features within the feature category increases; and
assigning a evaluative tag of non applicable based on available data to a feature category if the value of an item in a product category does not change with numerical valuation of features within a feature category,
wherein the evaluative tag is used to rank items in a product category.

12. The method of claim 6 further comprising:
presenting a user with a choice of at least two feature categories for sorting; and
sorting items within a product category according to the user chosen feature categories, the weighted importance of all the feature categories and the evaluative metrics of the feature categories applied to the features within the feature categories.

13. The method of claim 1 further comprising:
deriving ranges of values within feature categories from the data records to determine natural ranges for grouping numerical features.

14. The method of claim 13 further comprising:
presenting a user with sub-ranges of values within feature categories for filtering product data to be presented.

15. The method of claim 1 further comprising:
applying statistical analysis to derive the placement of an item within a product category with respect to at least one feature category.

16. The method of claim 15 wherein statistical analysis is applied to derive the placement of an item within a product category with respect to two feature categories.

17. The method of claim 15 further comprising:
graphing the placement of an item within a product category.

18. The method of claim 17 further comprising:
presenting the user with a graph of the placement of a user chosen item with respect to other items in a product category based on the at least one feature category.

19. The method of claim 1 further comprising:
assigning a part of relation type if items in a product category are used only by inclusion in items in a second product category,
assigning a accessory relation type if items in a first product category are used only in conjunction with a second product category although the items in the second product category may be used without the items in the first product category,
assigning a resource relation type if items in a first product category are used only in conjunction with items in a second product category and must be replaced or replenished; and
creating links within each product category to reflect each assigned relation type.

20. The method of claim 19 further comprising:
creating hierarchical category trees using the kind of relation type assignments wherein each hierarchical category tree has one product category that is only a parent category.

21. The method of claim 1 further comprising:
assigning a weighted importance to buying information categories of product based on available data and ranking merchants offering products based on the weighted importance of the buying information categories.

22. The method of claim 21 further comprising:
assigning evaluative metrics to the buying information categories of the product categories and ranking the merchants offering each item based on the weighted importance of the buying information categories and evaluative metrics of the buying information categories.

23. The method of claim 21 wherein the buying information categories include price, shipping costs, shipping method and availability.

24. The method of claim 1 further comprising:
allowing a user to choose an item from a list of products in a product category; and
displaying the merchants selling the chosen products.

25. The method of claim 24 further comprising:
displaying buying information for each merchant selling the chosen products.

26. The method of claim 24 further comprising:
displaying the merchant buying information in a ranked list wherein the merchant buying information is ranked according to a weighted importance assigned to each buying information category and evaluative metrics applied to each buying information category based on the data records.

27. The method of claim 1, further including graphically rendering the user's selections indicating importance of the plurality of feature categories to the user.

28. The method of claim 1, further including graphically rendering said plurality of feature categories for the user.

* * * * *